Patented Nov. 15, 1949

2,488,201

UNITED STATES PATENT OFFICE 2,488,201

REMOVAL OF LEAD AND ZINC FROM COPPER AMMONIUM SALT SOLUTIONS

Herman C. Kenny, Lake Linden, and Lawrence C. Klein, Hubbell, Mich., assignors to Calumet and Hecla Consolidated Copper Company, Calumet, Mich., a corporation of Michigan No Drawing. Application August 23, 1946, Serial No. 692,739

13 Claims. (Cl. 23—61)

This invention relates to purification of copper ammonium salt solutions and more particularly to the removal of lead and zinc from such solutions.

It has been long known that ammoniacal copper carbonate or copper ammonium carbonate solutions can be used as leaching solutions for dissolving metallic copper. In the use of such solutions for dissolving copper scrap it frequently happens that they become contaminated with various deleterious metallic ions principally those of lead and zinc. Accordingly, a simple and inexpensive method of removing these impurities is desirable.

We have now discovered that lead, iron, manganese and zinc as well as traces of deleterious suspended matter can be removed from such solutions by a process entailing a primary treatment with a small quantity of a soluble alkaline earth salt, a period of reaction and a secondary treatment with a soluble silicate. The effect and importance of each of these steps will become apparent.

The purification of an ammoniacal copper carbonate solution offers peculiar difficulties which are not encountered in the purification of the ordinary types of acid leaches. In order to make clear the chemical processes involved in the purification it is first necessary to briefly describe the method of obtaining the copper solution.

As commercially practiced the solution circulating in the leaching system is an aqueous solution of copper ammonium carbonate with an excess of ammonium carbonate. The copper in this solution when used for leaching is oxidized to the cupric state by air in an absorber tower. This solution is then percolated through tanks containing the copper bearing materials. The cupric ammonium carbonate solution dissolves metallic copper thereby becoming reduced to form cuprous ammonium carbonate. Theoretically, it is possible to dissolve one ton of copper metal for every ton of copper already in the solution as cupric ammonium carbonate, but this limit is never completely attained. A portion of this rich solution from the tanks, containing copper in amount equivalent to the metallic copper which was dissolved, is distilled to decompose it into copper oxide, ammonia and carbon dioxide. Ammonia stills are used for this purpose, steam entering at the bottom, and the solution entering at the top. The copper oxides are discharged at the bottom with waste liquor (water with trace of ammonia). The ammonia and carbon dioxide with water vapor go to a condenser, where they are cooled to form "distillate." The undistilled portion of the rich solution, and the distillate are combined, water, carbon dioxide and ammonia are added as required and this is treated with air to make up a new leach solution.

A typical leaching solution would contain 10 to 60, preferably 30 to 40 grams per liter of copper (90 to 100% oxidized—that is in the cupric state), 30 to 100, preferably about 60 grams per liter of ammonia, and 20 to 60, preferably about 40 grams per liter of carbon dioxide. The rich solution might contain from 10 to 100 grams per liter of copper with about the same concentrations of ammonia and carbon dioxide as in the leach solution. The amount of copper dissolved determines the relative amounts of copper in the cuprous and the cupric state in the rich solution.

While operating on pure copper no difficulties are experienced and such a process has operated satisfactorily for many years. However, in adapting this process to treating mixed or contaminated materials, such as scrap, containing not only metallic copper but other metals or metallic compounds in varying proportions, it has been found that small portions of these other metals enter the leaching solutions together with the copper and produce undesirable impurities in the product.

These impurities are principally, lead, zinc, iron and manganese. Of these only the zinc would, from chemical considerations, be expected to occur in the ammoniacal solution. However, the fact is that the lead, iron and manganese are present in colloidal or suspensoidal form, as the element or as oxide, hydroxide, basic oxide, carbonate or a mixture of these.

The ordinary means usually employed for removing lead, iron and manganese from solutions fail in this case. Mechanical methods employing filtration through various grades of filter media with and without the use of various industrial absorbents remove only a small amount of lead. Unsatisfactory attempts at clarification were made using coke breeze, activated charcoal, fuller's earth and diatomaceous earth.

The usual chemical means were also tried: soluble compounds of iron and aluminum were added to the solution to form a gelatinous precipitate of their respective hydroxides, and these to some extent did occlude the lead but proved disadvantageous in other ways. Ferric chloride, for example, extracted about 85% of the lead from solutions containing cupric copper; however, in the case of solutions in which the copper was mostly in the cuprous state the iron was reduced, and the ferrous hydroxide dissolved in the leach, poor extractions were experienced, and the oxide made therefrom contained excessive amounts of iron. Since the solutions treated are usually about 80% reduced, this method of extraction was abandoned. Precipitation with aluminum and iron was also troublesome because of the difficulty in filtering the gelatinous hydroxide that was formed in either case.

We have found that on adding barium chloride or calcium chloride to the solution, the lead can be over 90% removed under favorable conditions and the iron and manganese substantially reduced to the point where they are no longer an important factor as far as purity of product is concerned. This removal depends on the formation of a flocculent precipitate of barium or calcium carbonate which if present in optimum amount successfully occludes the colloidal or suspensoidal impurities such as lead, iron and manganese.

While either barium chloride or calcium chloride is effective in removing lead, we prefer to make use of barium chloride for several reasons. It effects better precipitation than calcium chloride with a smaller amount of reagent so that the cost of the reagent in the two cases is comparable. A smaller amount of precipitate is formed and thus less of a filtering problem is encountered. Less carbon dioxide is lost from the solution in forming the carbonate precipitate, and a smaller amount of the chloride ion is introduced into the circuit. Further, calcium carbonate is soluble to some slight extent in the leaching solution, and so would appear in the product; whereas the barium carbonate is insoluble. It is not practical to use magnesium chloride or strontium chloride as the carbonates of these metals are excessively soluble in the solution. Also, the strontium chloride is too expensive for practical purposes.

The barium or calcium carbonate precipitate, in addition to removing lead from the solutions, removes substantially all of the iron (probably present as fine iron oxide particles encountered when leaching copper-clad steel materials) that enters the solution, and also manganese entering from the same source.

The barium or calcium carbonate precipitate also entrains and eliminates dirt and suspended organic matter, fine, undissolved copper particles, and also cuprous hydroxide or basic copper carbonate precipitates occasionally formed in saturated solutions. This accounts for the copper content of 4-5% encountered in the barium carbonate precipitate. Barium chloride or calcium chloride should be added in proportion to form in the solution being treated from 0.4 to 6.0 grams per liter of carbonate precipitate. If barium chloride is used it is preferable to add it in proportion to form from 0.4 to 1.2 grams per liter of barium carbonate floc while in the case of calcium chloride it is preferable to form from 1.5 to 6.0 grams per liter of calcium carbonate floc. However, in either case useful results can be had anywhere between 0.4 and 6.0

Precipitation of the zinc as an insoluble compound imposed many difficulties in the choice of a reagent because most of the reagents that precipitate zinc from an ammoniacal solution also precipitate copper, particularly so from a solution in which the copper is present in high concentration compared to the amount of zinc present. Several chemicals were tried, among them hydrogen sulfide, potassium ferrocyanide, the various sodium phosphates, sodium cyanide, sodium and potassium chromates and potassium dichromate, and the silicates of sodium, and others. Of the reagents used, hydrogen sulfide and potassium ferrocyanide precipitated an appreciable amount of zinc, but also precipitated an objectionable amount of copper along with the zinc. The various silicates of soda precipitated most of the zinc from various cuprammonium salt solutions (for example, hydroxide, sulfate, chloride, carbonate), without precipitating an appreciable amount of copper.

With the exception of sodium metasilicate, the silicates of sodium do not exist as true chemical compounds, but vary as to the ratio of silicon dioxide to sodium oxide content from approximately 1, for the sodium metasilicate, to 3.9. Three different grades of the silicates of sodium were tested, varying from 1:1 to 3.25:1 in $SiO_2$ to $Na_2O$ content, so as to represent the different extremes and an intermediate ratio. Although all of the silicates used removed zinc equally well if a sufficient amount of the reagent were present, the grade containing the greater ratio of silica to sodium oxide proved to be the most economical to use. The "F" (3.25:1) grade of sodium silicate (Du Pont), and most intermediate grades of sodium silicate, are sold as a water solution and the sodium metasilicate is sold as a solid. The "F" grade of sodium silicate contains approximately 38% silicate of soda by weight.

For copper solutions that untreated would yield a copper oxide ranging up to 0.2% in zinc content, satisfactory extraction can be obtained using about 7 ml. of "F" grade per liter of solution to be treated, or 7 liters of silicate of soda per cubic meter of solution to be treated. For higher concentrations of zinc the amount of reagent must be proportionately increased.

In precipitating the zinc with the sodium silicate, best results were obtained by using a diluted solution of sodium silicate and adding this to the rich leaching solution. The "F" grade silicate of soda was diluted with from 2 to 5 parts of water before adding, thus giving a 12.5% to a 6.3% solution as against a 38% solution when undiluted and giving from 9.4% to 4.7% of $SiO_2$, as against 28.5% $SiO_2$ when undiluted, percentages by weight. If concentrated solutions of the silicates are used there is a tendency for some copper silicate to precipitate, especially if the "rich" solution is high in copper content (over 70 grams per liter). To precipitate the zinc the solution should be added slowly to the rich leach, and the mixture thoroughly agitated. Sufficient time should be allowed for reaction before filtering off the precipitated silicates, 10 to 20 minutes being sufficient, and depending on the amount of silicate used.

The precipitate formed when the silicate is added to the leaching solution probably consists of a silicate of zinc, and also a considerable amount of silicic acid, that makes a flocculent, easily filtered precipitate. A certain amount of sodium silicate remains in solution; so a slight amount of silica may be found in the oxide made from the solution. The greater part of the silicate in solution will be eliminated in the still waste. Any small amount of silica remaining in the oxide should not be objectionable to the trade because of its chemical inertness. Samples of oxide made by boiling treated solution to dryness were within the U. S. Navy specification limits for nitric acid insoluble matter for grade 1 cuprous oxide.

(52C4c, April 2, 1945; 0.3% HNO₃ insoluble maximum.)

As most of the cupric ammonium carbonate solutions found in commercial practice contain zinc together with one or more of the group lead, iron and manganese it is usually necessary to treated with both sodium silicate and barium chloride. However, when these two reagents are mixed together or added simultaneously to the rich solution they react to form barium silicate in whole or in part which lessens their effectiveness in eliminating the metallic impurities. We have found, however, that if the barium chloride is added from 2 to 5 minutes before the sodium silicate, assuming ample agitation, that the removal of lead and related impurities is complete and that the subsequent addition of sodium silicate is highly effective in removing zinc. The two precipitates, barium carbonate and zinc silicate, are inert to one another and there is no release of metallic impurities back into the solution. It is also possible to reverse this addition, i. e. add the sodium silicate first, but in this case because of the much slower reaction in the formation of the zinc silicate precipitate, a longer time interval of from 10 to 20 minute must elapse. In either case a single filtration is required to remove the two precipitates, and produce a purified copper solution.

While the discussion thus far outlined shows the operation of my invention on a solution containing a mixture of zinc and lead, iron or manganese it will work equally well on solutions containing zinc alone or lead, iron or manganese alone or in conjunction with each other.

For example, in the case where zinc is the only impurity it is necessary to treat only with sodium silicate and filter.

Again, in the case where one or more of the impurities lead, iron or manganese is present the only treatment required is that with barium chloride.

As mentioned above only one filtration is necessary to separate the two precipitates from the solution. If, however, it is desired to treat the barium precipitate and convert the barium carbonate back to the chloride and eliminate the lead, it might be desirable to employ two filters, one for each precipitate.

The copper in the precipitates may be recovered by known methods i. e. addition to a copper reverberatory furnace charge where the copper will be reduced to metal, the zinc volatilized and the remaining components removed in a slag.

It is possible to regenerate barium chloride from barium carbonate by dissolving the precipitates in muriatic acid, then adding barium sulfide in the form of the impure "black ash." This precipitates any lead that is soluble in the muriatic acid, also the copper in the precipitate. The precipitate is filtered off and the solution boiled free of excess acid and hydrogen sulfide. The solution may then be reused as it is or evaporated and the barium chloride crystallized out.

The following specific examples will serve to illustrate the invention:

Example I

A rich copper solution containing both zinc and lead was treated with barium chloride solution and, after five minutes, with Du Pont's "F" grade sodium silicate solution. The rich solution contained 65 grams per liter of Cu, 0.263 gram per liter of Zn and 0.062 gram per liter of Pb. To 250 cc. of the rich solution was added 0.25 gram of $BaCl_2.2H_2O$ dissolved in 15 cc. of water. The solution was stirred well for 5 minutes, then 2.5 cc. of Du Pont's "F" grade sodium silicate solution dissolved in 10 cc. of water was added. The solution was again stirred well, allowed to stand for 20 minutes and filtered. The filtrate was boiled down to the oxide and analyzed, showing 68.17% Cu, .057% Zn and 0.014% Pb. The original solution before treatment when boiled down to the oxide showed 67.5% Cu, 0.273% Zn and 0.064% Pb.

Example II

The procedure of Example I was repeated except that the sodium silicate was added first and the barium chloride second; the interval between and all other factors remaining the same. The filtrate was boiled down to oxide and analyzed, showing 67.73% Cu, 0.112% Zn and 0.019% Pb.

Example III

The leaching solution employed contained approximately 35 grams per liter of copper, about 98% in the cupric state, about 60 grams per liter of ammonia (calculated as $NH_3$) and about 40 grams per liter of $CO_2$. The rich solution contained about 65 grams per liter of copper and ammonia and $CO_2$ concentrations remained at about 60 and 40 grams per liter respectively. The lead content was about 0.051 gram per liter.

Plant tests were made using both calcium chloride and barium chloride solutions. The reagent was dissolved in water and stored in a 1000-gallon tank. This was bled at a controlled rate into the pipe line carrying pregnant solution from the leaching tanks to the "rich" storage tank. Here a settling period occurred, and the solution was next pumped through a Sweetland filter where the precipitate was separated, and the treated solution was pumped to another storage tank for subsequent distilling.

*Calcium chloride run.*—The calcium chloride was made up as a 30% solution of Dowflake calcium chloride. This solution was fed into the rich solution line at the rate of about 60 gallons per hour, the rate of flow of the rich solution being about 15 cubic meters per hour. No agitation was employed other than that received in the pipe line so that maximum extraction probably was not obtained. After the run the precipitate was discharged from the filter and analyzed for copper, lead and iron. It showed: copper 4.83%, lead 1.51%, iron 1.03%.

Lead concentration in the rich solution was about 0.051 gram per liter. The oxide from the treated solution assayed 0.018% lead whereas oxide from the untreated solution would be expected to assay 0.058% lead.

*Barium chloride run.*—The barium chloride was used in the same manner as the calcium chloride, except a more dilute solution was used. Five hundred pounds of the crystals $BaCl_2.2H_2O$ were dissolved in 800 gallons of water (giving a solution containing 0.5 lb. barium chloride per gallon of solution), and this solution was fed into two rich solutions containing about 0.036 and 0.045 gram per liter of lead (as Pb) at the rate of 60 gallons (526 lbs.) per hour, the rate of flow of the rich solution in the line being approximately 15 cubic meters (39630 lbs.) per hour. The dilution of the barium chloride is not critical, however, and much more concentrated solutions for example 1 to 5 gallons per cubic meter of rich solution to be treated could have been used. Samples of the solution were taken before and after treatment and boiled to the oxide for analysis. Following is a summary of the results, and the extractions:

| Untreated Rich Solution (Oxide) Per Cent Pb | Treated Solution (Oxide) Per Cent Pb | Percent Extraction |
|---|---|---|
| 0.0413 | 0.0103 | 75.1 |
| 0.0516 | 0.0132 | 74.4 |

After the run the Sweetland filter was dumped. The precipitate was washed free of solution, dried, and assayed for lead; the precipitate assayed 3.10% lead.

As with the calcium chloride run, no agitation was used for this run, and it is probable that with agitation extractions considerably higher than those obtained would be realized.

*Example IV*

Using a rich copper solution containing 0.263 gram per liter of Zn, treatment was carried out with sodium silicate.

The following is the assay of a sample of oxide made from a solution from which the zinc had been removed by adding a large excess of Du Pont's "F" grade silicate of soda, (15 ml.) to 1 liter:

|  | Per cent |
|---|---|
| Cu | 77.80 |
| Zn | 0.018 |
| $SiO_2$ | 0.438 |
| $HNO_3$ insoluble | 0.050 |

It should be noted that in this experiment the oxide obtained was produced by evaporating the rich solution to dryness and therefore contained silica derived from water soluble silicate. In practice these silicates would be essentially eliminated as still waste. The silicate should always be approximately equal to or somewhat in excess of the stoichiometric equivalent for the Zn present, suitably 1.0 to 2.0 and preferably from 1.1 to 1.5 times theoretical.

The precipitate formed from the silicate addition contains a small amount of copper—about 0.3 gram is precipitated from each liter of solution treated. This can readily be recovered by smelting the precipitate formed; wherein the zinc will be eliminated in the stack gases, and the silicates will serve as a flux.

Extraction of the zinc with "F" grade silicate of soda was tried on several different solutions, oxide made from which when untreated ranged from 0.2% to 5.3% Zn. In all cases extractions in excess of 90% of the zinc were obtained by using sufficient amounts of the reagent.

Having thus described our invention, what we claim is:

1. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof and also containing zinc in solution, the steps of forming in such solution a flocculent precipitate by adding a solution of a soluble salt of a metal of the class consisting of barium and calcium and thereafter adding a solution of a soluble silicate whereby to form with the zinc in solution a precipitate, and then separating from said copper ammonium carbonate solution the said precipitates thus formed together with occluded and adherent solids.

2. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof and also containing zinc in solution, the steps of forming in such solution 0.4 to 6.0 grams per liter of a fluocculent precipitate by adding a solution of a soluble salt of a metal of the class consisting of barium and calcium and, after the lapse of at least two minutes for the reacton to proceed, adding a solution of a soluble silicate, said soluble silicate being added in proporton from 1.0 to 2.0 times the amount theoretically required to combine with the zinc present and then separating from said copper ammonium carbonate solution the said precipitates thus formbed together with occluded and adherent solids.

3. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof and also containing zinc in solution, the steps of forming in such solution from 0.4 to 1.2 grams per liter of a fluocculent barium carbonate precipitate by adding a solution of a soluble barium salt, and, after the lapse of at least two minutes for the reaction to proceed, adding a solution of sodium silicate, said sodium silicate being added in proportion from 1.1 to 1.5 times the amount theoretically required to combine with the zinc present and then separating from said copper ammonium carbonate solution the said precipitates formed together with occluded and adherent solids.

4. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof and also containing zinc in solution, the steps of forming in such solution from 1.5 to 6.0 grams per liter of a fluocculent calcium carbonate precipitate by adding a solution of a soluble calcium salt, and, after the lapse of at least two minutes for the reaction to proceed, adding a solution of sodium silicate, said sodium silicate being added in proportion from 1.1 to 1.5 times the amount theoretically required to combine with the zinc present and then separating from said copper ammonium carbonate solution the said precipitates thus formed together with occluded and adherent solids.

5. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixture thereof, the steps of forming in such solution a flocculent precipitate by addition of a soluble salt of a metal of the class consisting of barium and calcium and separating from said copper ammonium carbonate solution such precipitate together with occluded and adherent solids.

6. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof, the steps of forming in such solution from 0.4 to 6.0 grams per liter of a fluocculent precipitate by adding a solution of a soluble salt of a metal of the class consisting of barium and calcium and separating from said copper ammonium carbonate solution such precipitate together with occluded and adherent solids.

7. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof, the steps of forming in such solution from 0.4 to 1.2 grams per ltier of a flocculent precipitate by adding a solution of barium chloride and separating from said copper ammonium carbonate solution such precipitate together with occluded and adherent solids.

8. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof, the steps of forming in such solution a flocculent precipitate by adding a solution of barium chloride and separating from said copper ammonium carbonate solution such precipitate together with occluded and adherent solids, said barium chloride solution containing from 0.5 to 2.5 lbs. $BaCl_2$ per gallon and being added at the rate of from 1 to 5 gallons per cubic meter of copper ammonium carbonate solution.

9. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof, the steps of forming in such solution from 1.5 to 6.0 grams per liter of a flocculent precipitate by adding a solution of calcium chloride and separating from said copper ammonium carbonate solution such precipitate together with occluded and adherent solids.

10. In purification of a solution of copper ammonium carbonate containing lead in a physical state of the class consisting of colloidal and suspensoidal and present as a material of the class consisting of the element, the oxide, the hydroxide, the basic oxide, the basic carbonate and mixtures thereof, the steps of forming in such solution a flocculent precipitate by adding a solution of calcium chloride and separating from said copper ammonium carbonate solution such precipitate together with occluded and adherent solids, said calcium chloride solution containing from 1 to 3 lbs. $CaCl_2$ per gallon and being added at the rate of from 2 to 10 gallons per cubic meter of copper ammonium carbonate solution.

11. In purification of a solution of a copper ammonium salt having zinc in solution as an impurity therein, the step of adding a soluble silicate whereby to form a precipitate of zinc silicate and separating the precipitate from said solution.

12. In purification of a solution of copper ammonium carbonate having zinc in solution as an impurity therein, the step of adding sodium silicate whereby to form a precipitate of zinc silicate and separating the precipitate from said solution.

13. In purification of a solution of copper ammonium carbonate having zinc in solution as an impurity therein, the step of adding sodium silicate whereby to form a precipitate of zinc silicate and separating the precipitate from said solution, the quantity of sodium silicate added being from 1.1 to 1.5 times the theoretical quantity required to react with the zinc present.

HERMAN C. KENNY.
LAWRENCE C. KLEIN.

REFERENCES CITED

The following references are of record in the file of this patent:

UNITED STATES PATENTS

| Number | Name | Date |
|---|---|---|
| 648,354 | Collins | Apr. 24, 1900 |
| 1,538,089 | Carothers | May 19, 1925 |
| 2,081,351 | Booth | May 25, 1937 |

FOREIGN PATENTS

| Number | Country | Date |
|---|---|---|
| 228,260 | Great Britain | Feb. 2, 1925 |

OTHER REFERENCES

Mellor, Comprehensive Treatise on Inorganic and Theoretical Chemistry, vol. 3, page 818, 1923 Ed.; vol. 6, page 323, 1925 Ed., Longmans, Green & Co., N. Y., publishers.